United States Patent
Chung et al.

(10) Patent No.: US 10,087,083 B2
(45) Date of Patent: Oct. 2, 2018

(54) UNDERWATER HOLDING-TYPE LITHIUM RECOVERING APPARATUS AND METHOD THEREROF

(71) Applicant: KOREA INSTITUTE OF GEOSCIENCE AND MINERAL RESOURCES, Daejeon (KR)

(72) Inventors: Kang-Sup Chung, Daejeon (KR); Byoung-Gyu Kim, Daejeon (KR); Taegong Ryu, Daejeon (KR); Jungho Ryu, Daejeon (KR); In-Su Park, Gyeryong-si (KR); Hye-Jin Hong, Daejeon (KR)

(73) Assignee: KOREA INSTITUTE OF GEOSCIENCE AND MINERAL RESOURCES, Daejeon (KR)

(*) Notice: Subject to any disclaimer, the term of this patent is extended or adjusted under 35 U.S.C. 154(b) by 310 days.

(21) Appl. No.: 15/007,778

(22) Filed: Jan. 27, 2016

(65) Prior Publication Data
US 2016/0214869 A1 Jul. 28, 2016

(30) Foreign Application Priority Data

Jan. 28, 2015 (KR) .................. 10-2015-0013275

(51) Int. Cl.
*C01D 15/00* (2006.01)
*B01J 47/00* (2017.01)
(Continued)

(52) U.S. Cl.
CPC ............ *C01D 15/00* (2013.01); *B01J 47/012* (2017.01); *C22B 3/24* (2013.01); *C22B 26/12* (2013.01);
(Continued)

(58) Field of Classification Search
CPC .. C22B 3/24; C22B 3/42; C22B 26/12; C01D 15/00; B01J 47/011; B01J 47/012;
(Continued)

(56) References Cited

U.S. PATENT DOCUMENTS 4,416,860 A * 11/1983 Heitkamp .............. B01D 15/02
210/170.11
6,461,502 B1 * 10/2002 Nobukawa ................ C02F 1/28
210/170.11
(Continued)

FOREIGN PATENT DOCUMENTS

CN        1810353       8/2006
CN      103045879       4/2013
(Continued)

*Primary Examiner* — Matthew O Savage
(74) *Attorney, Agent, or Firm* — Hauptman Ham, LLP (57) ABSTRACT

Provided is an underwater holding-type lithium recovering apparatus 1000 including: an underwater holder 100 installed on an offshore sea bed; a lithium adsorbent 200 held in the underwater holder 100 and adsorbing lithium ions contained in seawater; a moving ship 300 installed with a cleaning tank 320 cleaning the lithium adsorbent 200 transferred from the underwater holder 100 and a desorbing tank 330 desorbing lithium ions adsorbed in the lithium adsorbent 200 transferred from the cleaning tank 320, and moved to a coastline when lithium ions of a reference value or more are filled in the desorbing tank 330; and a transfer pump 400 transferring lithium ions filled in the desorbing tank 330 to a reservoir 500 installed at the coastline.

10 Claims, 9 Drawing Sheets

(51) Int. Cl.
  *C22B 3/24*    (2006.01)
  *C22B 26/12*   (2006.01)
  *B01J 47/012*   (2017.01)
  *B01J 47/011*   (2017.01)
  *B01J 49/05*    (2017.01)
  *B01J 49/60*    (2017.01)
  *B01J 47/024*   (2017.01)
  *C22B 3/42*    (2006.01)

(52) U.S. Cl.
  CPC ............ *B01J 47/011* (2017.01); *B01J 47/024* (2013.01); *B01J 49/05* (2017.01); *B01J 49/60* (2017.01); *C22B 3/42* (2013.01); *Y02P 10/234* (2015.11)

(58) Field of Classification Search
  CPC .......... B01J 47/024; B01J 49/05; B01J 49/60; Y02P 10/234
  See application file for complete search history.

(56) References Cited

U.S. PATENT DOCUMENTS 9,771,632 B2 * 9/2017 Kim ..................... C22B 26/12
2011/0174739 A1 * 7/2011 Chung .................. C22B 3/02
                    210/670

FOREIGN PATENT DOCUMENTS

| JP | 01108324 A * | 4/1989 |
| JP | 2002088420 | 3/2002 |
| JP | 2008280615 | 11/2008 |
| KR | 101403364 | 6/2014 |

* cited by examiner

UNDERWATER HOLDING-TYPE LITHIUM RECOVERING APPARATUS AND METHOD THEREROF

CROSS-REFERENCE TO RELATED APPLICATIONS

This application claims priority under 35 U.S.C. § 119 to Korean Patent Application No. 2015-0013275, filed on Jan. 28, 2015, in the Korean Intellectual Property Office, the disclosure of which is incorporated herein by reference in its entirety.

TECHNICAL FIELD

The present invention relates to an underwater holding-type lithium recovering apparatus and method for recovering lithium contained in seawater.

BACKGROUND

Recently, in accordance with the rapid development of a cellular phone, a notebook, and an electric car industry, an international demand on a mobile energy source is gradually increased. As the above-mentioned energy source, particularly, utilization of a lithium secondary battery has explosively increased. Currently, a lithium secondary battery industry is developed in Korea, Japan, and China, and in accordance with a rapid increase in demand of the lithium secondary battery, consumption of lithium, which is a major substance, has been rapidly increased. Further, since lithium is used to increase tritium in a thermonuclear fusion power generation which is expected as a next generation energy source, a demand on lithium has gradually increased.

It is estimated that about 250 billion tons of lithium ions are dissolved in seawater, and as a result, the seawater has begun to be recognized as an important lithium supplying source. However, since concentration of lithium is very low at 0.17 mg per 1 liter of seawater, when considering economical efficiency for recovering lithium ions, a system cable of recovering lithium ions selectively and at low costs is required.

In order to recover lithium ions from seawater, methods such as an ion-exchange adsorption method, a solvent desorption method, and a coprecipitation method have been researched, and among these methods, a lithium ion recovering method using a manganese oxide-based inorganic adsorbent having ion-exchange characteristics having very high selectivity is one of most preferable methods. As a result, various manganese oxide-based inorganic adsorbent have been developed (see, Ind. Eng. Chem. Res., 40, 2054, 2001). The manganese oxide-based inorganic adsorbent adsorbs lithium ions in a liquid by ion-exchange of hydrogen ions and lithium ions in the liquid including the lithium ions, that is topotactic extraction, and consequently, the inorganic adsorbent in which the lithium ions are adsorbed enables the lithium ions to be recovered by the ion-exchange of the hydrogen ions and the lithium ions in a diluted hydrochloric acid aqueous solution. Thus, the above-mentioned manganese oxide-based inorganic adsorbent has an advantage in that it may be repeatedly used.

However, in a process according to the related art in which lithium manganese oxide powders, which are particles having a size of about 10 μm, of several tens kilograms (kg) or more, and further a great quantity of lithium manganese oxide powder of units of tons or more are processed by an acid aqueous solution to form manganese oxide, a large acid resistance water tank and a flowing apparatus for allowing the acid aqueous solution to be effectively reacted with the powder are required.

Further, a process of separating and drying the liquid obtained after the lithium manganese oxide powders are processed by the acid aqueous solution is additionally required. As such, the lithium ion recovering apparatus according to the related art and the lithium ion recovering method using the same are very complex and inconvenient, and have problems in that attention is required in a processing operation, and the like.

As the Related Art, Japanese Patent Laid-Open Publication No. 2002-088420 (Related Art 1 titled "Apparatus for Recovering Lithium from Seawater") includes a ship body having a seawater variable means, a seawater introducing path communicating a bottom surface of a hold part of the ship body into the sea to provide a communicating path at a lower side of the ship body, nets installed on a side of a seawater inlet and a side of a seawater outlet of the hold part, a lithium adsorbent received between the nets in the hold part to have granularity greater than a mesh of the net, a seawater circulating means for pressing the seawater introduced from the outside of the ship body into the hold part to pass through the lithium adsorbent together with the seawater introduced from the seawater introducing path, and then circulating and draining the seawater passing through the lithium adsorbent outside of the hold part, a draining means for discharging the remaining seawater in the hold part, a desorption solution injecting and recovering means for injecting a desorption solution into the hold part and recovering the desorption solution in which lithium is dissolved from inside of the hold part, and a desorption and liquefaction circulating means for circulating the desorption solution in the hold part to desorb lithium from the lithium adsorbent 10.

However, according to Related Art 1, there is a problem in that a large amount of power is required to introduce the seawater into the ship body and discharge the seawater.

To solve the above-mentioned problem, the applicant has proposed a lithium recovery station in Related Art 2 (Korean Patent Publication No. 1383299) including: a floating body floating on the sea; a moving means installed on the floating body and for moving a lithium adsorbent; an adsorption tank formed in a structure in which upper and lower surfaces thereof are opened on the floating body and the lithium adsorbent passes through so that the lithium adsorbent vertically passes through the floating body; a cage formed in a frame structure to be connected to the lower surface of the adsorption tank, and in which the lithium adsorbents passing through the adsorption tank are sequentially stacked therein and lithium ions are adsorbed in a state in which the cage is immerged in the seawater; a cleaning tank installed on the floating body and for cleaning the lithium adsorbent in which the lithium ion lifted by the moving means from the cage is adsorbed; and a desorption tank installed on the floating body and for desorbing the lithium ion of the lithium adsorbent in which the lithium ion moved from the cleaning tank by the moving means is adsorbed.

However, the lithium recovery station according to Related Art 2 adsorbs lithium in a manner in which the lithium adsorbent is held in the adsorption tank and the cage which are installed on the station itself floating on the sea. When an amount of lithium adsorbent used in an enlargement process becomes large, large sized adsorption tank and cage are required to be manufactured to accommodate the large amount of lithium adsorbent. As a result, it causes a super-sized lithium recovery station.

Therefore, according to Related Art 2, there was a problem in that costs for constructing and maintaining a plant of the lithium recovery station at the sea are quite expensive.

SUMMARY

An embodiment of the present invention is directed to providing an underwater holding-type lithium recovering apparatus/system and method capable of minimizing costs for constructing and maintaining the apparatus/system.

In one general aspect, an underwater holding-type lithium recovering apparatus 1000 includes: an underwater holder 100 installed on an offshore sea bed; a lithium adsorbent 200 held in the underwater holder 100 and adsorbing lithium ions contained in seawater; a moving ship 300 installed with a cleaning tank 320 cleaning the lithium adsorbent 200 transferred from the underwater holder 100 and a desorbing tank 330 desorbing lithium ions adsorbed in the lithium adsorbent 200 transferred from the cleaning tank 320, and moved to a coastline when lithium ions of a reference value or more are filled in the desorbing tank 330; and a transfer pump 400 transferring lithium ions filled in the desorbing tank 330 to a reservoir 500 installed at the coastline.

The underwater holder 100 may include an underwater weight 110 seated on the offshore sea bed, and an underwater case 120 coupled to an upper side of the underwater weight 110.

The underwater case 120 may have an upper surface which is opened and a bent step 121 formed around the upper surface and externally bent from the underwater case 120.

A plurality of underwater holders 100 may be installed on the offshore sea bed.

The lithium adsorbent 200 may have an inclined step 210 dented to be internally inclined at an edge of a lower surface thereof.

The underwater holding-type lithium recovering apparatus 1000 may further include a cage surrounding the lithium adsorbent 200.

In another general aspect, an underwater holding-type lithium recovering method includes: installing an underwater holder 100 on an offshore sea bed; holding a lithium adsorbent 200 in the underwater holder 100 to allow lithium ions contained in seawater to be adsorbed in the lithium adsorbent 200; moving a moving ship 300 near the underwater holder 100; transferring and cleaning the lithium adsorbent 200 held in the underwater holder 100 to a cleaning tank 320 installed in the moving ship 300; transferring the lithium adsorbent 200 cleaned by the cleaning tank 320 to a desorbing tank 330 installed in the moving ship 300 to desorb lithium ions adsorbed in the lithium adsorbent 200; moving the moving ship 300 to a coastline when lithium ions of a reference value or more are filled in the desorbing tank 330; and transferring lithium ions filled in the desorbing tank 330 to a reservoir installed at the coastline.

The underwater holder 100 may include an underwater weight 110 seated on the offshore sea bed, and an underwater case 120 coupled to an upper side of the underwater weight 110.

The underwater case 120 may have an upper surface which is opened and a bent step 121 formed around the upper surface and externally bent from the underwater case 120.

The lithium adsorbent 200 may have an inclined step 210 dented to be internally inclined at an edge of a lower surface thereof.

A plurality of underwater holders 100 may be installed on the offshore sea bed.

The holding of the lithium adsorbent 200 in the underwater holder 100 to allow lithium ions contained in seawater to be adsorbed in the lithium adsorbent 200 may include surrounding the lithium adsorbent 200 by a cage and holding the lithium adsorbent 200 in the underwater holder 100.

DETAILED DESCRIPTION OF EMBODIMENTS

Hereinafter, a technical spirit of the present invention will be described in more detail with reference to the accompanying drawings.

The accompanying drawings are only examples shown in order to describe the technical spirit of the present invention in more detail. Therefore, the technical spirit of the present invention is not limited to shapes of the accompanying drawings.

Figure 1:
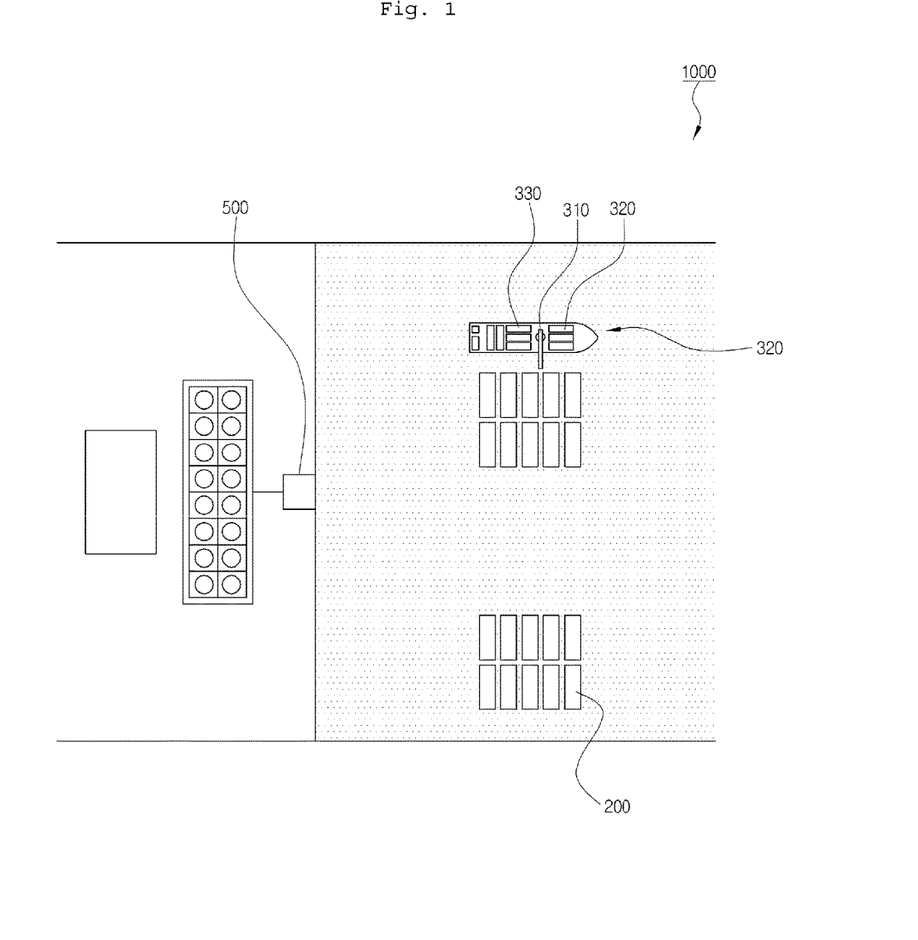
FIGS. 1 and 2 are front views illustrating a state in which a moving ship of an underwater holding-type lithium recovering apparatus according to the present invention is positioned at an offshore.
Figure 2:
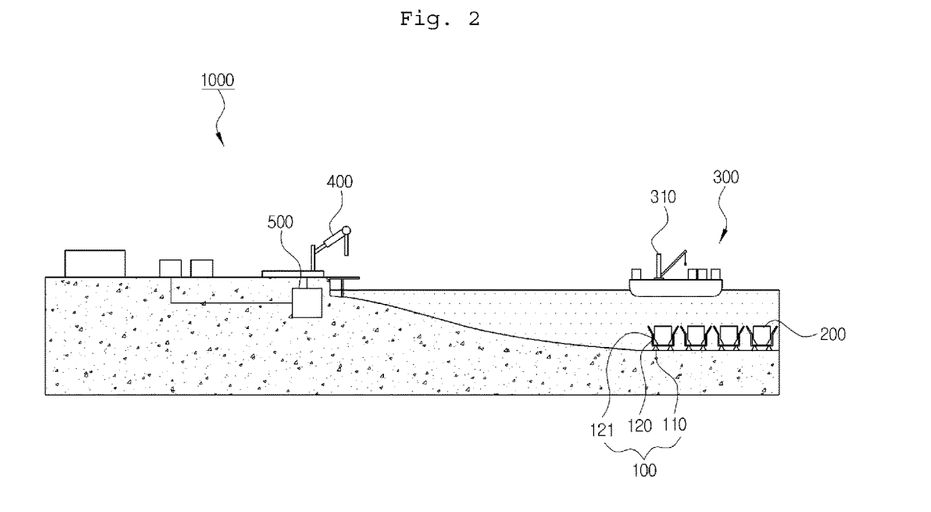
Figure 3A:
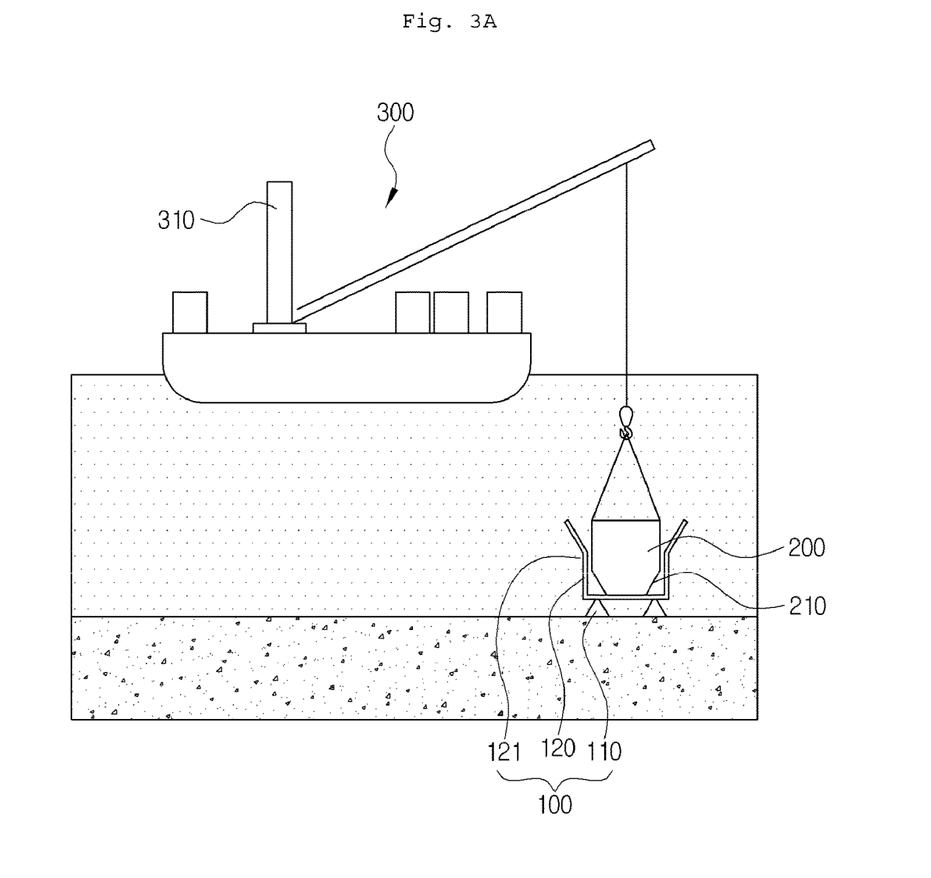
FIGS. 3A and 3B are schematic views illustrating a state in which a lithium adsorbent of the underwater holding-type lithium recovering apparatus according to the present invention is lifted from an underwater holder.
Figure 3B:
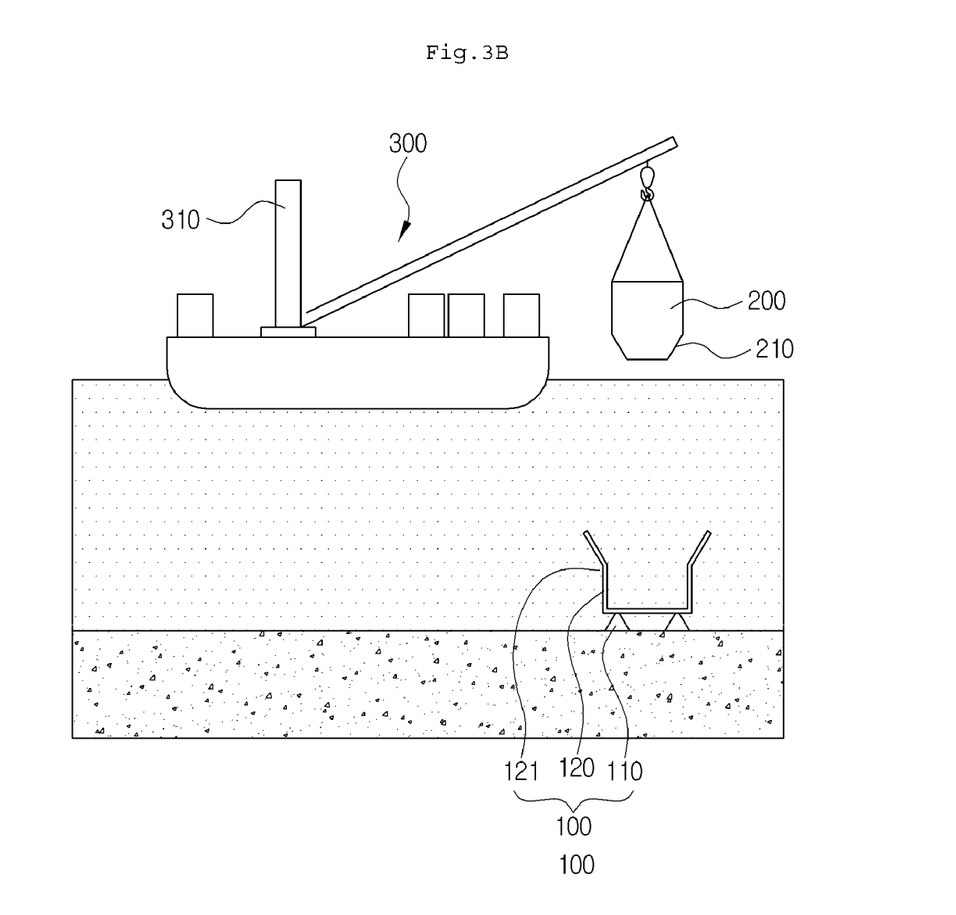
Figure 4A:
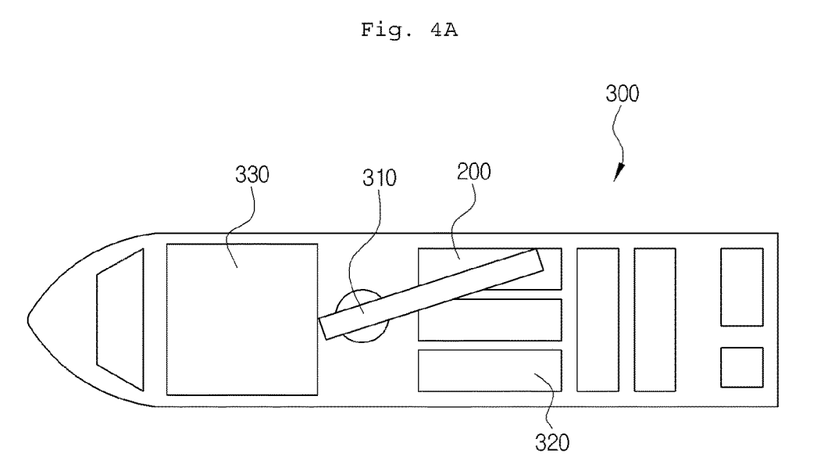
FIGS. 4A and 4B are schematic views illustrating a state in which the lithium adsorbent of the underwater holding-type lithium recovering apparatus according to the present invention is transferred from a cleaning tank of the moving ship to a desorbing tank.
Figure 4B:
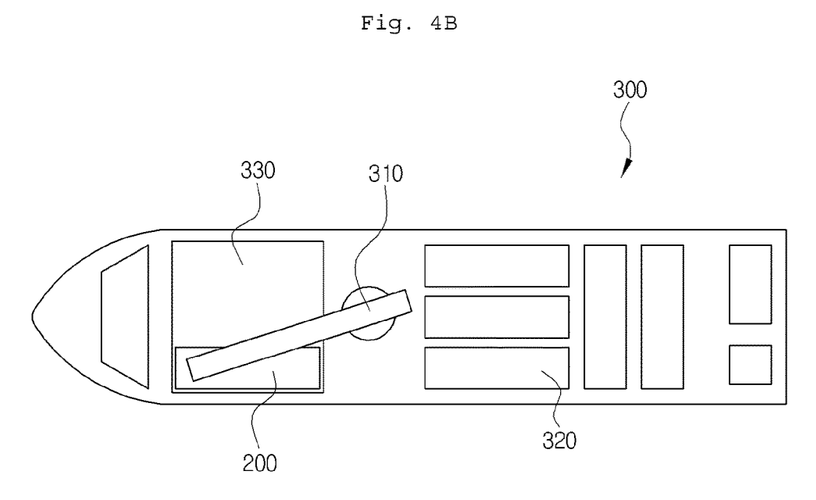
Figure 5:
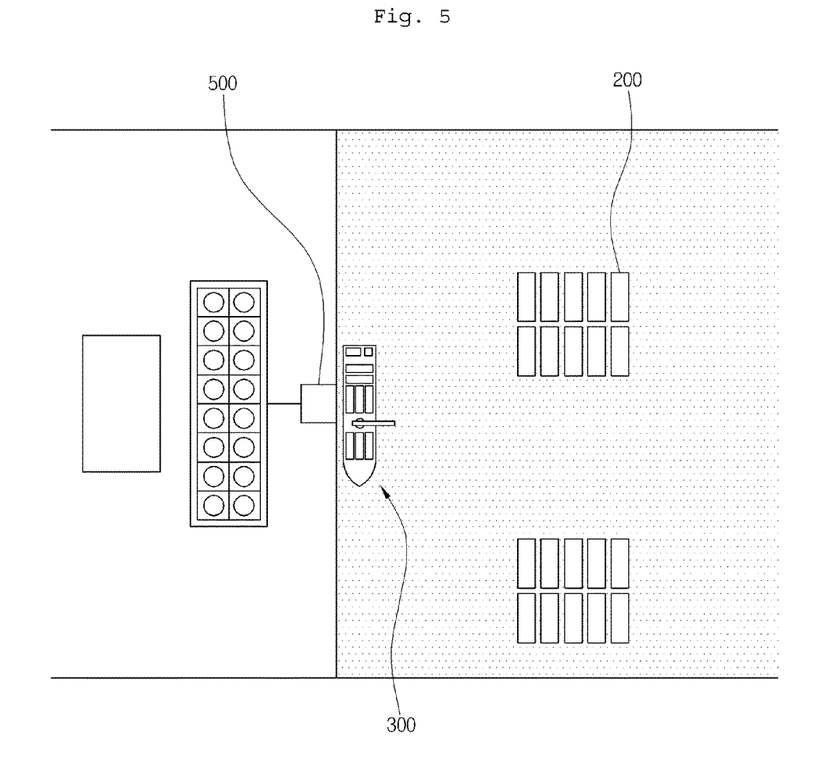
FIG. 5 is a schematic view illustrating a state in which the moving ship of the underwater holding-type lithium recovering apparatus according to the present invention is moved to a coastline.
Figure 6:
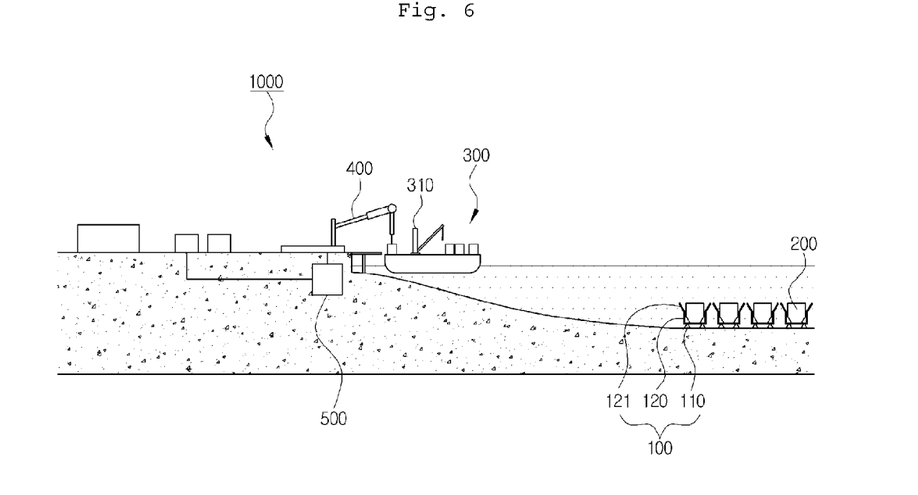
FIG. 6 is a schematic view illustrating a state in which lithium ions filled in the desorbing tank of the underwater holding-type lithium recovering apparatus according to the present invention are transferred to a reservoir by a transfer pump.

FIGS. 1 and 2 are front views illustrating a state in which a moving ship of an underwater holding-type lithium recovering apparatus according to the present invention is positioned at an offshore, FIGS. 3A and 3B are schematic views illustrating a state in which a lithium adsorbent of the underwater holding-type lithium recovering apparatus according to the present invention is lifted from an underwater holder, FIGS. 4A and 4B are schematic views illustrating a state in which the lithium adsorbent of the underwater holding-type lithium recovering apparatus according to the present invention is transferred from a cleaning tank of the moving ship to a desorbing tank, FIG. 5 is a schematic view illustrating a state in which the moving ship of the underwater holding-type lithium recovering apparatus according to the present invention is moved to a coastline, and FIG. 6 is a schematic view illustrating a state in which lithium ions filled in the desorbing tank of the underwater holding-type lithium recovering apparatus according to the present invention are transferred to a reservoir by a transfer pump.

As illustrated in FIGS. 1 and 2, an underwater holding-type lithium recovering apparatus 1000 according to the present invention is configured to include an underwater holder 100, a lithium adsorbent 200, a moving ship 300, and a transfer pump 400.

The underwater holder 100 is installed on an offshore sea bed, and serves to hold the lithium adsorbent 200.

The lithium adsorbent 200 is held in the underwater holder 100, and adsorbs lithium ions contained in seawater.

Here, as the lithium adsorbent 200, a high selectivity lithium adsorbent 200 capable of adsorbing lithium by ion-exchange may be used, and may be manganese oxide.

In this case, as the manganese oxide, spinel-type manganese oxide, particularly, spinel-type manganese oxide having a three-dimensional (1×3) tunnel structure is preferable, manganese oxide expressed by chemical formula of $H_nMn_{2-x}O_4$ (in the formula, 1≤n≤1.33, 0≤x≤0.33, and n≤1+x) is more preferable, and $H_{1.33}Mn_{1.67}O_4$ is most preferable, but the manganese oxide is not limited thereto. Modified manganese oxide such as $H_{1.6}Mn_{1.6}O_4$ having more improved performance may also be used for the present invention.

The moving ship 300 is installed with a crane 310, a cleaning tank 320, and desorbing tank 330.

As illustrated in FIGS. 3A and 3B, the crane 310 serves to transfer the lithium adsorbent 200.

The cleaning tank 320 is installed on an upper surface of the moving ship 300, and cleans the lithium adsorbent 200 transferred from the underwater holder 100 by the crane 310.

In this case, the cleaning tank 320 serves to clean salt and impurities attached to the lithium adsorbent 200 in which lithium ions are adsorbed.

As illustrated in FIGS. 4A and 4B, the desorbing tank 330 is installed on the upper surface of the moving ship 300 to be spaced apart from the cleaning tank 320 by a predetermined interval, and desorbs lithium ions adsorbed in the lithium adsorbent 200 transferred from the cleaning tank 320 by the crane 310.

In this case, the desorbing tank 330 may be further installed with an ultrasonic vibrator (not illustrated) applying an ultrasound to the lithium adsorbent 200 so that lithium ions adsorbed in the lithium adsorbent 200 may be more easily desorbed.

Meanwhile, as illustrated in FIG. 5, when lithium ions of a reference value or more are filled in the desorbing tank 330 of the moving ship 300, the moving ship 300 is moved to a coastline.

As illustrated in FIG. 6, the transfer pump 400 transfers lithium ions filled in the desorbing tank 330 to a reservoir installed at the coastline.

The lithium recovery station according to the Related Art adsorbs lithium in a manner in which the lithium adsorbent is held in the adsorption tank and the cage which are installed on the station itself floating on the sea. When an amount of lithium adsorbent used in an enlargement process becomes large, large sized adsorption tank and cage are required to be manufactured to accommodate the large amount of lithium adsorbent. As a result, it causes a super-sized lithium recovery station.

However, the underwater holding-type lithium recovering apparatus according to the present invention uses a manner in which a configuration of a large capacity of lithium adsorbent apparatus is held in a wide offshore seawater using an underwater holder on a sea bed without being installed on a specific structure or a floating body on the sea when lithium in seawater is recovered using a large amount of lithium adsorbent, thereby making it possible to minimize costs for constructing and maintaining the apparatus because a lithium absorption equipment and the moving ship at the sea need not be large.

Meanwhile, the underwater holder 100 may be configured to include an underwater weight 110 seated on the offshore sea bed, and an underwater case 120 coupled to an upper side of the underwater weight 110.

The underwater case 120 may have an upper surface which is opened, and a bent step 121 formed around the upper surface and externally bent from the underwater case 120.

Figure 7:
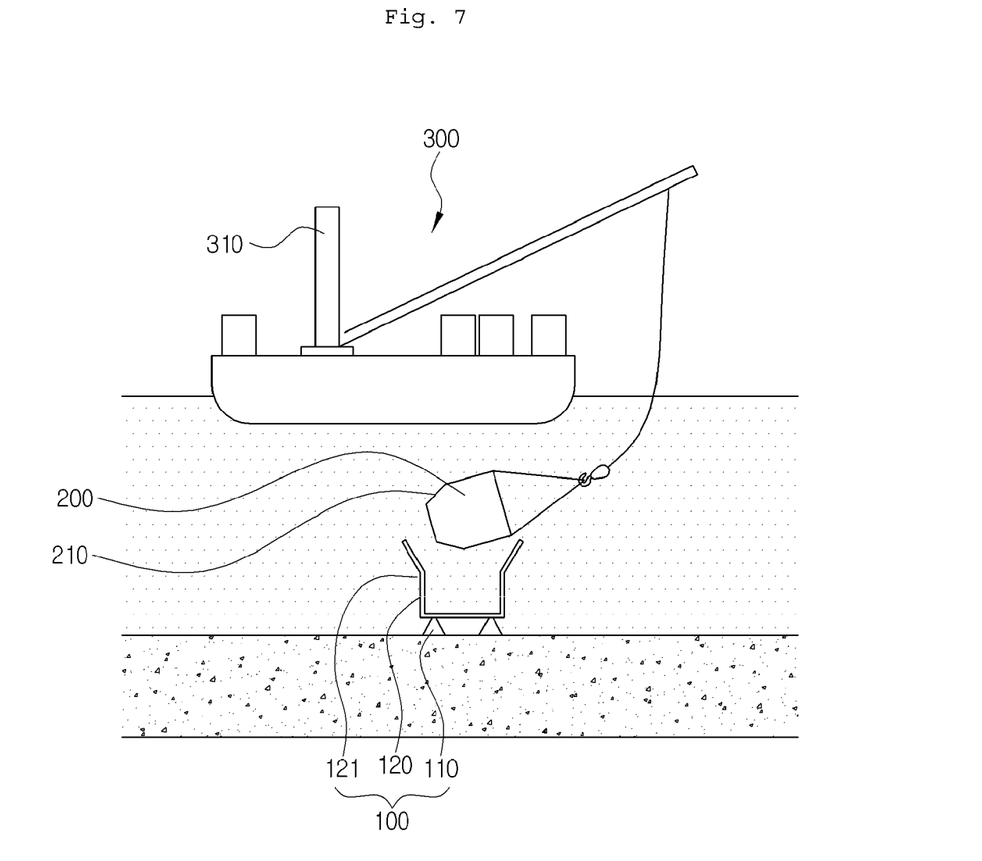
FIG. 7 is a schematic view illustrating a state in which the lithium adsorbent of the underwater holding-type lithium recovering apparatus according to the present invention is inserted into the underwater holder.

FIG. 7 is a schematic view illustrating a state in which the lithium adsorbent of the underwater holding-type lithium recovering apparatus according to the present invention is inserted into the underwater holder.

As illustrated in FIG. 7, the lithium adsorbent 200 may be more easily inserted into the underwater case 120 through the bent step 121 even in a state in which the lithium adsorbent 200 is affected by an offshore tidal current.

In this case, the lithium adsorbent 200 may have an inclined step 210 dented to be internally inclined at an edge of a lower surface thereof so as to be more easily inserted into the underwater case 120.

Figure 8:
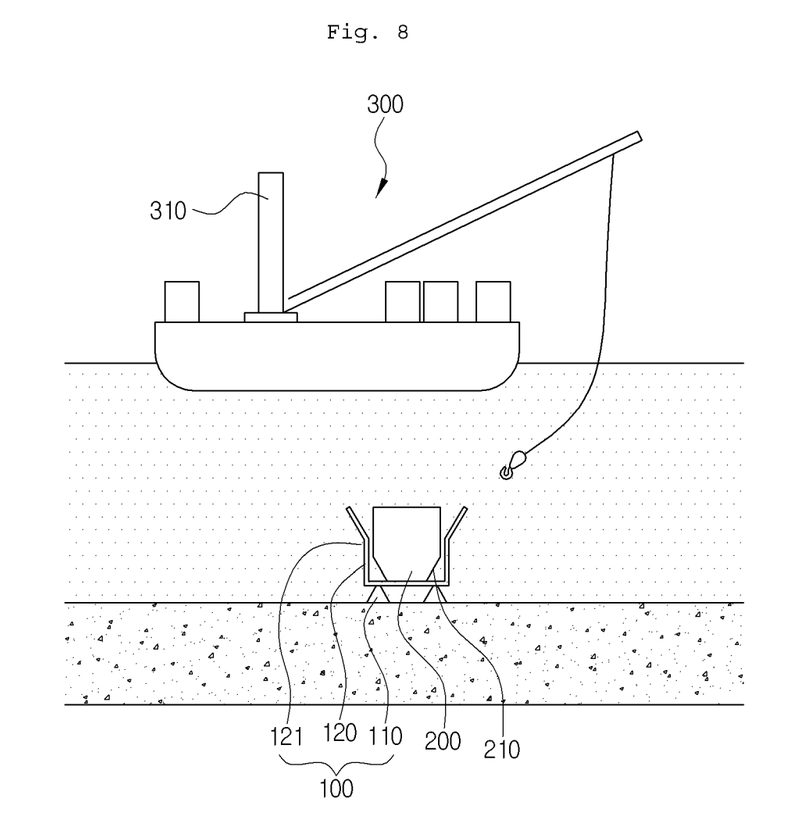
FIG. 8 is a schematic view illustrating a state in which the lithium adsorbent of the underwater holding-type lithium recovering apparatus according to the present invention is discharged from the underwater holder.

FIG. 8 is a schematic view illustrating a state in which the lithium adsorbent of the underwater holding-type lithium recovering apparatus according to the present invention is discharged from the underwater holder.

As illustrated in FIG. 8, a mounting ring of the crane 310 (an end portion of the crane 310) is further installed with a sensing sensor sensing the lithium adsorbent 200 to sense a position of the lithium adsorbent 200 inserted into the underwater holder 100, thereby making it possible to more easily mount the lithium adsorbent in the mounting ring of the crane 310.

A plurality of underwater holders 100 may be installed on the offshore sea bed.

Meanwhile, the underwater holding-type lithium recovering apparatus 1000 may be configured to further include a cage surrounding the lithium adsorbent 200 so that the lithium adsorbent 200 is not damaged by the offshore tidal current.

The cage may be formed in a frame shape, and may be formed of materials such as stainless steel and concrete so that corrosion by seawater is prevented.

An underwater holding-type lithium recovering method according to the present invention may be configured to include first to six operations.

In the first operation, the underwater holder 100 is installed on the offshore sea bed.

In the second operation, the lithium adsorbent 200 is held in the underwater holder 100, and adsorbs lithium ions contained in seawater.

In the third operation, the moving ship 300 is moved near the underwater holder 100.

In the fourth operation, the lithium adsorbent 200 held in the underwater holder 100 is transferred to the cleaning tank 320 installed in the moving ship 300 so as to be cleaned.

In the fifth operation, the lithium adsorbent 200 cleaned by the cleaning tank 320 is transferred to the desorbing tank 330 installed in the moving ship 300 to allow lithium ions adsorbed in the lithium adsorbent 200 to be desorbed.

In the sixth operation, when lithium ions of a reference value or more are filled in the desorbing tank 330, the moving ship 300 is moved to the coastline.

In the seventh operation, lithium ions filled in the desorbing tank 330 are transferred to the reservoir installed at the coastline.

Meanwhile, the underwater holder 100 may be configured to include an underwater weight 110 seated on the offshore sea bed, and an underwater case 120 coupled to an upper side of the underwater weight 110.

The underwater case 120 may have an upper surface which is opened and a bent step 121 formed around the upper surface and externally bent from the underwater case 120.

The lithium adsorbent 200 may be more easily inserted into the underwater case 120 through the bent step 121 even in a state in which the lithium adsorbent 200 is affected by an offshore tidal current.

In this case, the lithium adsorbent 200 may have an inclined step 210 dented to be internally inclined at an edge of a lower surface thereof so as to be more easily inserted into the underwater case 120.

A plurality of underwater holders 100 may be installed on the offshore sea bed.

Meanwhile, the second operation may be configured to include a 2-1 operation in which a cage surrounds the lithium adsorbent 200 so that the lithium adsorbent 200 is not damaged by the offshore tidal current, and a 2-2 operation in which the lithium adsorbent 200 is held in the underwater holder 100.

FIG. 7 is a schematic view illustrating a state in which the lithium adsorbent of the underwater holding-type lithium recovering apparatus according to the present invention is inserted into the underwater holder.

FIG. 8 is a schematic view illustrating a state in which the lithium adsorbent of the underwater holding-type lithium recovering apparatus according to the present invention is discharged from the underwater holder.

According to the exemplary embodiment of the present invention, the underwater holding-type lithium recovering apparatus uses a manner in which a configuration of a large capacity of lithium adsorbent apparatus is held in a wide offshore seawater using the underwater holder on the sea bed without being installed on a specific structure or a floating body at the sea when lithium in the seawater is recovered using a large amount of lithium adsorbent, thereby making it possible to minimize costs for constructing and maintaining the apparatus because a lithium absorption equipment and a moving ship on the sea do not need to increase in size.

The present invention is not limited to the above-mentioned exemplary embodiments, and may be variously applied, and may be variously modified without departing from the gist of the present invention claimed in the claims.

What is claimed is:

1. An underwater lithium recovering apparatus comprising:
    an underwater holder installed on an offshore sea bed;
    a lithium adsorbent held in the underwater holder and for adsorbing lithium ions contained in seawater;
    a moving ship installed with a cleaning tank for cleaning the lithium adsorbent transferred from the underwater holder and a desorbing tank for desorbing lithium ions adsorbed in the lithium adsorbent transferred from the cleaning tank and the moving ship movable to a coastline when an amount of lithium ions of a reference value or more are filled in the desorbing tank; and
    a transfer pump configured to transfer lithium ions filled in the desorbing tank to a reservoir.

2. The underwater lithium recovering apparatus of claim 1, wherein the underwater holder includes an underwater weight seated on the offshore sea bed, and an underwater case coupled to an upper side of the underwater weight.

3. The underwater lithium recovering apparatus of claim 2, wherein the underwater case has an upper surface which is opened and a bent step formed around the upper surface and externally bent from the underwater case.

4. The underwater lithium recovering apparatus of claim 1, wherein a plurality of underwater holders are installed on the offshore sea bed.

5. The underwater lithium recovering apparatus of claim 3, wherein the lithium adsorbent has an inclined step dented to be internally inclined at an edge of a lower surface thereof.

6. An underwater lithium recovering method comprising:
    installing an underwater holder on an offshore sea bed;
    holding a lithium adsorbent in the underwater holder to allow lithium ions contained in seawater to be adsorbed in the lithium adsorbent;
    moving a moving ship near the underwater holder;
    transferring and cleaning the lithium adsorbent held in the underwater holder to a cleaning tank installed in the moving ship;
    transferring the lithium adsorbent cleaned by the cleaning tank to a desorbing tank installed in the moving ship to desorb lithium ions adsorbed in the lithium adsorbent;
    moving the moving ship to a coastline when an amount of lithium ions of a reference value or more are filled in the desorbing tank; and
    transferring lithium ions filled in the desorbing tank to a reservoir.

7. The underwater lithium recovering method of claim 6, wherein the underwater holder includes an underwater weight seated on the offshore sea bed, and an underwater case coupled to an upper side of the underwater weight.

8. The underwater lithium recovering method of claim 7, wherein the underwater case has an upper surface which is opened and a bent step formed around the upper surface and externally bent from the underwater case.

9. The underwater lithium recovering method of claim 8, wherein the lithium adsorbent has an inclined step dented to be internally inclined at an edge of a lower surface thereof.

10. The underwater lithium recovering method of claim 6, wherein a plurality of underwater holders are installed on the offshore sea bed.

* * * * *